US008255351B2

(12) United States Patent
Lee et al.

(10) Patent No.: US 8,255,351 B2
(45) Date of Patent: Aug. 28, 2012

(54) SYSTEM AND METHOD FOR FAULT PREDICTION IN HOME NETWORK

(75) Inventors: Chang Eun Lee, Daejeon (KR); Jun Hee Park, Daejeon (KR); Kyeong Deok Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 701 days.

(21) Appl. No.: 12/430,166

(22) Filed: Apr. 27, 2009

(65) Prior Publication Data
US 2010/0057649 A1    Mar. 4, 2010

(30) Foreign Application Priority Data

Sep. 4, 2008    (KR) .................. 10-2008-0087364

(51) Int. Cl.
G06F 17/00   (2006.01)
G06N 5/02   (2006.01)
(52) U.S. Cl. ........................................ 706/47
(58) Field of Classification Search .................. None
See application file for complete search history.

(56) References Cited

U.S. PATENT DOCUMENTS

| | | | | |
|---|---|---|---|---|
| 5,510,975 A | * | 4/1996 | Ziegler, Jr. | 700/49 |
| 5,544,036 A | * | 8/1996 | Brown et al. | 340/12.52 |
| 5,565,855 A | * | 10/1996 | Knibbe | 340/3.51 |
| 5,905,442 A | * | 5/1999 | Mosebrook et al. | 340/3.7 |
| 6,192,282 B1 | * | 2/2001 | Smith et al. | 700/19 |
| 6,275,166 B1 | * | 8/2001 | del Castillo et al. | 340/5.1 |
| 6,856,236 B2 | * | 2/2005 | Christensen et al. | 340/3.5 |
| 6,973,622 B1 | | 12/2005 | Rappaport et al. | |
| 7,257,744 B2 | * | 8/2007 | Sabet et al. | 714/56 |
| 2008/0133979 A1 | | 6/2008 | Lee et al. | |
| 2009/0094484 A1 | | 4/2009 | Son et al. | |

FOREIGN PATENT DOCUMENTS

| | | |
|---|---|---|
| KR | 1020030032406 A | 4/2003 |
| KR | 1020030059152 A | 7/2003 |
| KR | 1020060061009 A | 6/2006 |
| KR | 1020080051045 A | 6/2008 |
| KR | 1020090035152 A | 4/2009 |

OTHER PUBLICATIONS

Abuelma'atti et al. "A wireless network appliances interoperability architecture", IEEE, 2006, 6 pages.*
Merabati et. al. "Managing distributed networked appliances in home networks", Proceedings of the IEEE, Jan. 2008, pp. 166-185.*
Delgado et al. "Assistive human-machine interfaces for smart homes", Glyndwr University research online, 2007, 13 pages.*

* cited by examiner

*Primary Examiner* — Omar Fernandez Rivas
(74) *Attorney, Agent, or Firm* — Ladas & Parry LLP

(57) ABSTRACT

A system for fault prediction in a home network includes: a context generator for generating context information based on status data collected in real time about components of the home network; a specification interpreter for generating knowledge rules for fault detection by using specifications of the components of the home network; a context analyzer for analyzing if the context information meet the knowledge rules to classify the context information into normal situation contexts and abnormal situation contexts; a context pattern learner for generating new knowledge rules based on the abnormal situation contexts and fault rules corresponding to the abnormal situation contexts; a knowledge rule database for storing and managing the knowledge rules and the new knowledge rules; and a fault predictor for analyzing a correlation between the knowledge rules or the new knowledge rules and the generated context information, thereby predicting faults to be generated.

19 Claims, 9 Drawing Sheets

- RULE 1 : IF[AIRCONDITIONER IS RUNNUNG]
  THEN [TEMPERATURE GOES DOWN]
- RULE 2 : IF[BOILER IS RUNNUNG]
  THEN [TEMPERATURE GOES UP]

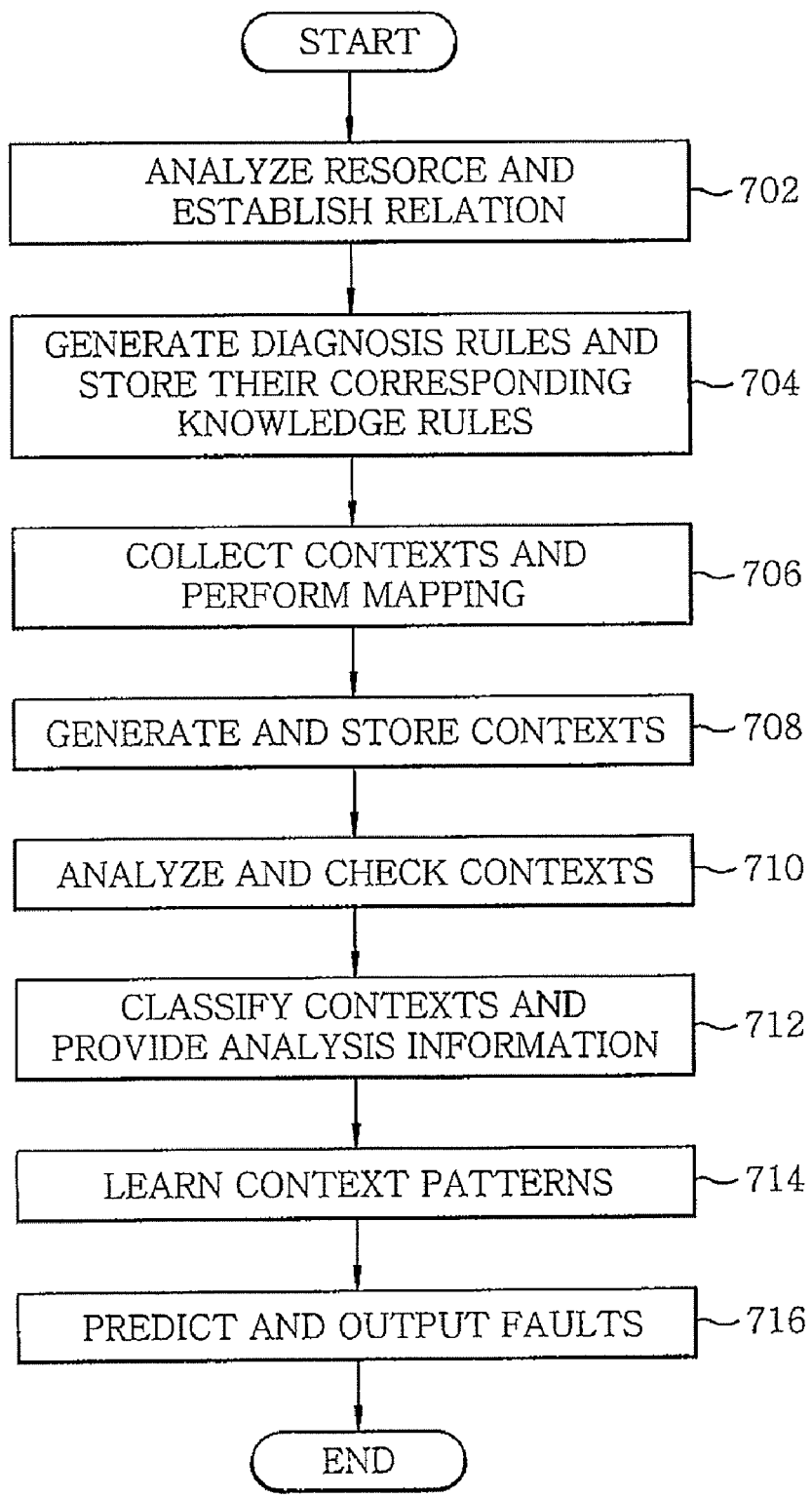

FIG.8A

|  | WHEN | WHO | WHAT | HOW | WHERE | WHY |
|---|---|---|---|---|---|---|
| C1 | 20070825115956 | TEMPERATURE | VALUE | 27 | LIVING | NULL |
| C2 | 20070825120000 | WINDOW | STATE | CLOSED | LIVING | NULL |
| C3 | 20070825120002 | BOILER | STATE | STOP | LIVING | NULL |
| C4 | 20070825120004 | AIRCONDITIONER | STATE | START | LIVING | NULL |
| C5 | 20070825120006 | TEMPERATURE | VALUE | 26.99 | LIVING | NULL |
| C6 | 20070825120008 | WINDOW | STATE | OPEN | LIVING | NULL |
| C7 | 20070825120010 | TEMPERATURE | VALUE | 26.99 | LIVING | NULL |

FIG.8B

○ RULE 1 : IF [AIRCONDITIONER IS RUNNUNG]
THEN [TEMPERATURE GOES DOWN]

FIG.8C

| NOMAL SITUATION CONTEXT | ABNORMAL SITUATION CONTEXT |
|---|---|
| THE CONTEXT PATTERN WHICH SATISFY RULE 1 : { C2, C3, C4 } | THE CONTEXT PATTERN WHICH DOES NOT SATISFY RULE 1 : { C6 } |

FIG.8D
NEW RULE : IF [ WINDOW IS OPEN AND AIRCONDITIONER IS RUNNUNG] THEN [TEMPERATURE DOESN'T GO DOWN]
FIG.9
CONTEXT PATTERN TO RULES
CORRELATION PROBABILITY TABLE
| CONTEXTS / RULES | R1 | R2 | R3 |
|---|---|---|---|
| C1, C2 | 0.5 | 0 | 0.2 |
| CONTEXTS / RULES | R1 | R2 | R3 |
|---|---|---|---|
| C1, C2, C3 | 0.7 | 0 | 0.5 |
| CONTEXTS / RULES | R1 | R2 | R3 |
|---|---|---|---|
| C1, C2, C3, C4, C5 | 1 | 0 | 0.7 |

SYSTEM AND METHOD FOR FAULT PREDICTION IN HOME NETWORK

CROSS-REFERENCE(S) TO RELATED APPLICATION(S)

The present invention claims priority of Korean Patent Application No. 10-2008-0087364, filed on Sep. 4, 2008, which is incorporated herein by reference.

FIELD OF THE INVENTION

The present invention relates to a technique for fault prediction in a home network, and more particularly, to a system and method which are suitable for predicting and reporting a fault in a home network using real-time status data in a home network environment.

BACKGROUND OF THE INVENTION

As well-known in the art, how to define faults or errors is the first consideration to develop a fault processing model for a home network system. A conventional method defining faults finds problems to be resolved in related fields and defines the faults based on the problems.

To this end, a range of faults to be considered should be decided on the basis of the expert knowledge in related fields, and those faults should also be defined under a basis for specialist systems in the fields among several bases of doing so.

In a recent home network environment, there are a variety of heterogeneous fieldbus devices such as RS422, RS485, LonWorks, CAN, PROFIBUS and so on, as well as many types of devices from simple sensor devices to intelligent systems. Due to wired/wireless protocols/networks supported by those various devices, the home network environment has a more complicated network topology structure.

Such a home network environment has a high fault possibility owing to the complicated network topology structure. To deal with this, a lot of techniques have been proposed which detect and recover potential faults.

Meanwhile, according to a conventional technique for fault detection and recovery against faults in the network environment, a detection signal is provided from a watch-dog controller to a watch-dog generator at periods set by a processor. When a first time-out takes place, the watch-dog generator reports this to the watch-dog controller, which then provides the processor with a non-maskable interrupt (NMI) for execution of recovery operation.

However, when there occurs any hardware fault in a system hardware board with embedded processor or infinite loop status of software due to program errors, the conventional fault detection and recovery technique first generates NMI for recovery of the abnormal status of the processor without resetting the processor. Next, if the abnormal status of the processor is still not recovered, the conventional fault detection and recovery technique resets the system hardware board to escape from the abnormal status. In this manner, since the conventional technique simply takes into consideration the normal or abnormal status of the processor and the infinite loop status of software, it may be applied to a simple system but is not suitable for an integrated system based on ubiquitous environments such as a ship where various faults may occur.

SUMMARY OF THE INVENTION

It is, therefore, an object of the present invention to provide a system and a method for fault prediction in a home network, which analyze fault patterns based on logs that occur in the home network and establish a knowledge rule-based database.

Another object of the present invention is to provide a system and method for fault prediction in a home network, which autonomously forms fault patterns for unstandardized situation faults over the home network to standardize and specify causes of the unstandardized situation fault.

In accordance with an aspect of the present invention, there is provided a system for fault prediction in a home network, including:

a context generator for generating context information based on status data collected in real time about components of the home network;

a specification interpreter for generating knowledge rules for fault detection by using specifications of the components of the home network;

a context analyzer for analyzing if the generated context information meet the generated knowledge rules to classify the context information into normal situation contexts and abnormal situation contexts;

a context pattern learner for generating new knowledge rules based on the abnormal situation contexts and fault rules corresponding to the abnormal situation contexts;

a knowledge rule database for storing and managing the knowledge rules and the new knowledge rules; and a fault predictor for analyzing a correlation between the knowledge rules or the new knowledge rules and the generated context information, thereby predicting faults to be generated.

In accordance with another aspect of the present invention, there is provided a method for fault prediction in a home network, including:

generating context information based on status data collected in real time about components of the home network;

generating knowledge rules for fault detection by using specifications of the components of the home network;

analyzing if the generated context information meet the generated knowledge rules to classify the context information into normal situation contexts and abnormal situation contexts;

generating new knowledge rules based on the abnormal situation contexts and fault rules corresponding to the abnormal situation contexts; and analyzing a correlation between the new knowledge rules and the generated context information thereby predicting faults to be generated.

BRIEF DESCRIPTION OF THE DRAWINGS

The above and other objects and features of the present invention will become apparent from the following description of preferred embodiments, given in conjunction with the accompanying drawings, in which.

Figure 1:
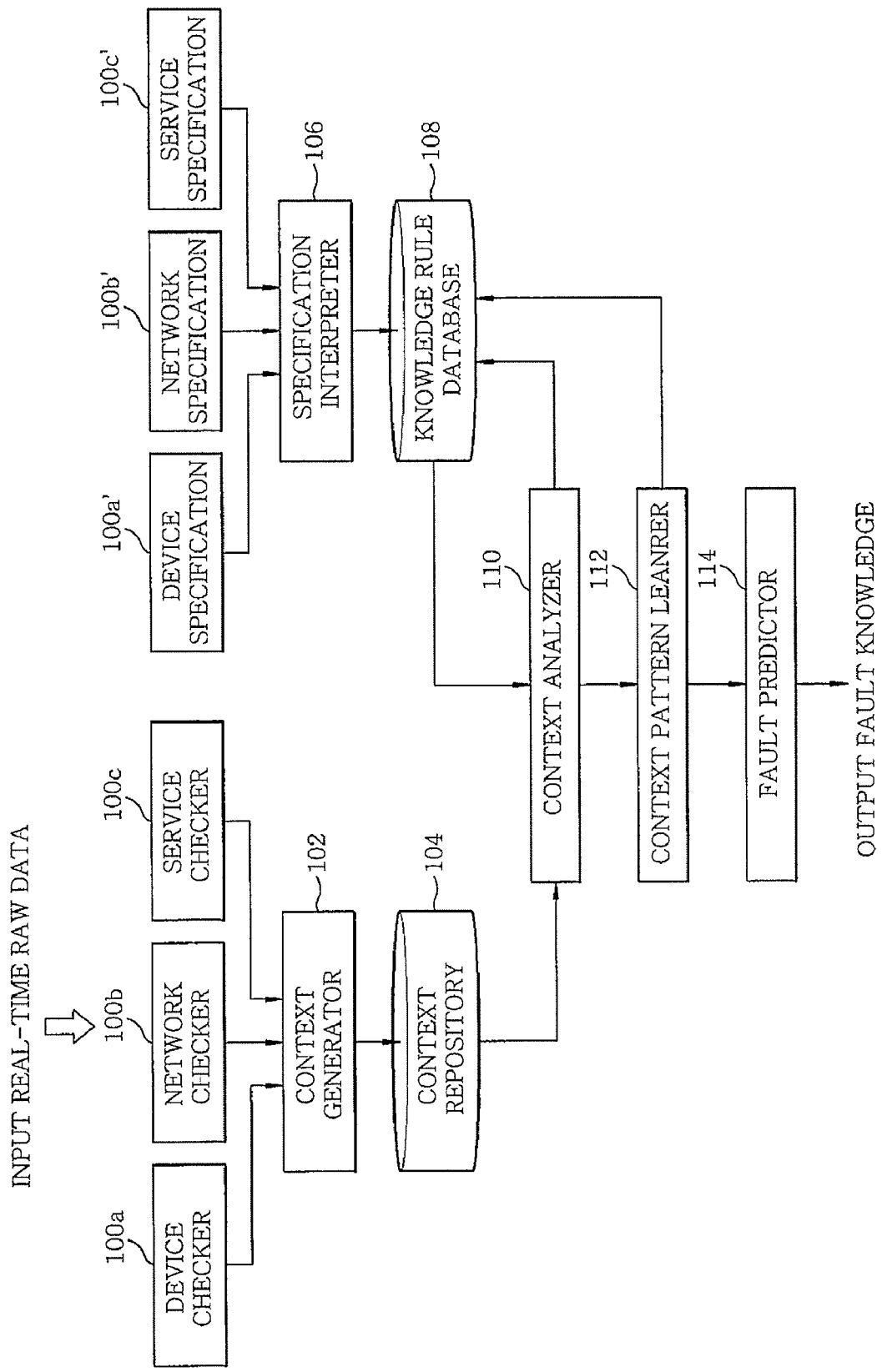
FIG. 1 illustrates a block diagram of a system for fault prediction in a home network in accordance with an embodiment of the present invention.

of devices, networks, systems, services, etc., and implicit faults such as wrong use, wrong configuration, context collision, fault transition, etc.

Table 1 below represents an example of fault classes on the explicit faults in accordance with the present invention.

TABLE 1

Fault Classes defined by abstracting Explicit Faults

| Classified Items | Component | Cause of Fault occurrence | Type | Function |
|---|---|---|---|---|
| Device | H/W Fault (CPU, Memory, Power, Bus, Peripherals), S/W Fault (Bootloader, Kernel, Device, Driver, Middleware, Application) | H/W Fault (Circuit, Digital Component, Analog Component), S/W Fault (Defective Code, Malicious Code) | Mobile Device/ Network Device/ Appliance/Sensor & Actuator Fault, . . . | Control/Monitoring Function Fault, Diagnosis/Recovery Function Fault, User-Defined Function Fault, . . . |
| Network | Node Fault (Start/Intermediate/End Node), Link Fault | Link Cutoff Fault, Interference Fault, Noise Fault, Bulk Traffic Fault, . . . | Wire Fault (PLC, IEEE1394, LAN, RS485 . . . ) Wireless Fault (RF, Zigbee, UWB, WLAN . . . ) | Unicast/Multicast/Broadcast Function Fault, . . . |
| System | H/W Fault (CPU, Memory, Power, Bus, Peripherals), S/W Fault (Bootloader, Kernel, Device, Driver, Middleware, Application) | H/W Fault (Circuit, Digital Component, Analog Component), S/W Fault (Defective Code, Malicious Code) | Gateway, Bridge, Server | Configuration/Connectivity/ Resource/Transaction Management Fault, . . . |
| Service | S/W Fault (Bootloader, Kernel, Device, Driver, Middleware, Application) | S/W Fault (Defective Code, Malicious Code) | Ship Control Service Fault, Ship Security Service Fault, . . . | Control/Monitoring Function Fault, Diagnosis/Recovery Function Fault, User-Defined Function Fault, . . . |

FIG. 7 illustrates a flow chart for a method for predicting faults based on log learning in a home network environment in accordance with the present invention;

FIGS. 8A to 8D are views showing an example of generating a new fault knowledge for the home network in accordance with the present invention; and FIG. 9 provides a correlation probability table corresponding to the new knowledge rules in accordance with the present invention.

DETAILED DESCRIPTION OF THE EMBODIMENTS

As will be described below, the present invention proposes a technique in which each context information inputted in real time about the current status of a home network is stored, each of the stored context information is compared with a knowledge rule corresponding to each specification of the home network previously stored in a database to generate and store a new knowledge rule, and, based on the new knowledge rule, faults in the home network are predicted and reported, through which the above-described problems of the prior arts can be overcome.

Hereinafter, exemplary embodiments of the present invention will be described in detail with reference to the accompanying drawings.

Prior to referring to drawings, according to the present invention, faults in a home network that may occur in a home network environment are defined suitably for characteristics by type of the faults. This is done by classifying those faults into explicit faults previously defined by each manufacturer The explicit faults indicate faults previously defined by each manufacturer of devices, networks, systems, services, etc. that are components of the home network, for example, a ship or the like. The diagnosis and recovery of such faults are performed on the basis of the fault diagnosis rules and fault recovery rules defined by each manufacture. However, the explicit faults made by each manufacture are classified and defined depending on different bases set by the fault classifiers thereof. Therefore, although the types of products are the same, they cannot use the same type of the faults, thereby providing only fault information related to the company's own products without any presentation of its derivative fault problems.

In particular, the home network environment involves a system in which components of the home network operate in conjunction with each other. Therefore, it is necessary to recognize and predict fault transition by using a correlation between fault information in the home network and other fault information in third-party products. To address this issue, as shown in Table 1, the fault classes are defined by abstracting the explicit faults depending on their attributes, and the abstracted fault classes abstract many types of explicit faults. Thus fault definition may be limited by mapping fault types, which may become enormous amounts depending on fault definition on the manufacturer's products, to the abstracted fault classes that have common characteristics with the fault types. In addition, the fact that a target fault class can affect another abstracted fault class on the basis of the common characteristics of the abstracted fault classes can be recognized by the correlation analysis between them.

Therefore, faults currently occurred can also be used to predict faults to be taken place in the future.

Meanwhile, the home network is under a complicated environment where plural heterogeneous network technologies match each other and devices with various functions exist. In this environment, it is very complicate and difficult to recognize the occurrence of implicit faults not explicit faults, to find the causes of the implicit faults, and to determine how to recover the implicit faults. Here, the implicit faults represent logical situation faults occurred in a combination of each component of the home network, i.e. each of devices, networks, systems and services, in which each component is normal as individual unit.

Table 2 below shows examples of scenarios for the situation faults.

TABLE 2

| Item | Senario |
| --- | --- |
| Case 1 | A temperature sensor and a humidity sensor of a captain's room detect sensing data which say temperature is 10° C. and humidity is 36%, respectively, and a boiler is not running, at 7 am, Mar. 3, 2008. |
| Case 2 | A temperature sensor of a room detects that temperature value is 30° C., and an air conditioner of a room keeps running at preset temperature 26° C. but the temperature does not go down, at 8 pm, Aug. 8, 2007. At this time, window is open. |

In Table 2, Case 1 illustrates the situation that a boiler is not running even in cold weather during winter. In this case, although the boiler may not generate an explicit fault message, it may be inferred from the situation that the boiler is malfunctioning.

Case 2 illustrates that an air conditioner is running at a preset temperature, 26° C., in hot weather during summer, but the temperature does not go down. From this, it may be inferred that the situation fault has occurred. Also, by monitoring factors (window, boiler, etc.) that may affect the temperature value, the cause of situation faults (e.g., the fact that the window is open) can be found.

In order to find these situation faults, the step of analyzing situation information is required. Analyzing situation information means identifying inefficient or unreasonable configuration status of the home network or abnormal status of devices or services by logical inference, as in the examples of the scenarios shown in Table 2. Referring to the examples of Cases 1 and 2, various causes of unstandardized situation faults can be standardized and specified over the home network. This may be accomplished by requiring the analysis of situation information to find out the operation status of the devices, based on status information of a space to which a device belongs or network information when the operation status of the device cannot be known only by the device-self diagnosis function.

Referring now to FIG. 1, there is illustrated a block diagram of a system for fault prediction in a home network, in accordance with an exemplary embodiment of the present invention. The system shown in FIG. 1 includes a context generator 102, a context repository 104, a specification interpreter 106, a knowledge rule database (DB) 108, a context analyzer 110, a context pattern learner 112, and a fault predictor 114, which will be explained, in turn, with related drawings.

The context generator 102 digitizes and normalizes status data of devices, networks, and services, which are collected in logs in real time, into context information based on 4W1H (when, where, who, what, and how) so as to establish a correlation between the status data and extract their features. The real-time data collection is done in a manner to check real-time raw data being inputted through a device checker 100a, a network checker 100b and a service checker 100c and then to collect various status data of devices, networks, services, etc. required for operation of the home network.

Figure 2:
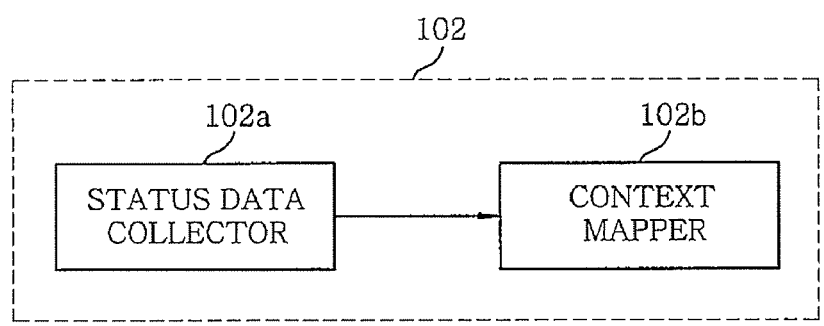
FIG. 2 illustrates a detailed block diagram of a context generator shown in FIG. 1.

FIG. 2 illustrates a detailed block diagram of the context generator 102 shown in FIG. 1. As shown in FIG. 2, the context generator 102 includes a status data collector 102a and a context mapper 102b. The status data collector 102a collects status data of devices, networks, and services through the device checker 100a, the network checker 100b and the service checker 100c, respectively, and provides those status data to the context mapper 102b. Then, the context mapper 102b digitizes and normalizes each status data into 4W1H-based context information to establish a correlation between the status data and to extract features of the status data. The correlation and the features may be contained in the context information for storage.

Referring back to FIG. 1, the context repository 104 stores and manages the context information containing the correlation between the status data and the features of the status data from the context generator 102. When required, the context information is extracted and provided to the context analyzer 110.

In the meantime, the specification interpreter 106 receives specifications for components of the home network from a device specification 100a', a network specification 100b', and a service specification 100c' and analyzes constraints on each component on the basis of the specifications for the components. In addition, the specification interpreter 106 generates knowledge rules for fault detection by using the analysis result for their storage in the knowledge rule DB 108.

Figure 3:
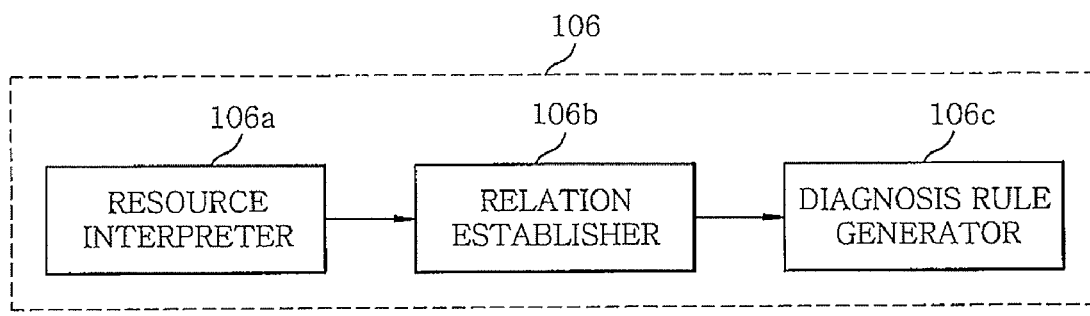
FIG. 3 offers a detailed block diagram of a specification interpreter shown in FIG. 1.

FIG. 3 presents a detailed block diagram of the specification interpreter 106 shown in FIG. 1. As shown in FIG. 3, the specification interpreter 106 includes a resource interpreter 106a, a relation establisher 106b, and a diagnosis rule generator 106c. The resource interpreter 106a interprets information (i.e., constraints) on the components such as devices, networks, services, etc. of the home network, and gives them semantic. The relation establisher 106b establishes a relation between the semantics of the components such as devices, networks, services, etc. The diagnosis rule generator 106c generates new knowledge rules for the home network on the basis of functions that affect the relation establishment between the specifications of the components.

Figure 4A:
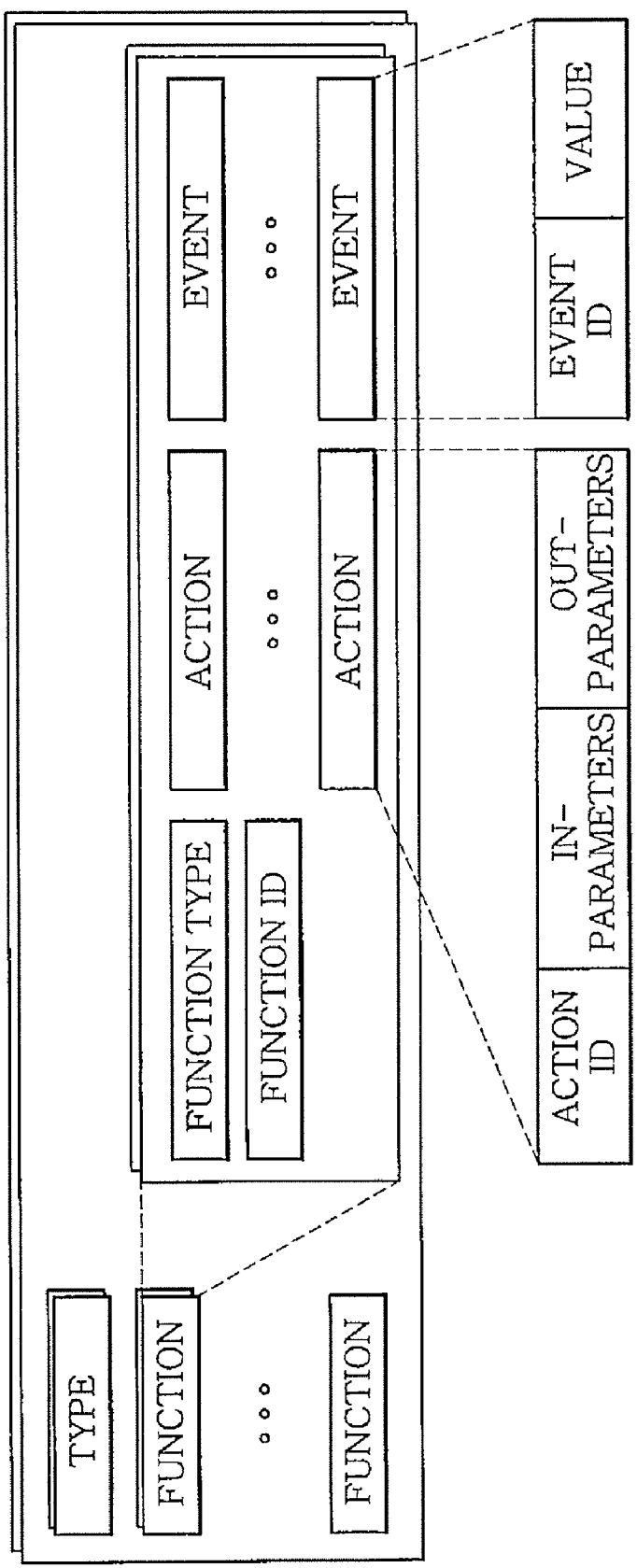
FIGS. 4A to 4C are views showing examples of generating knowledge rules for the home network in accordance with the present invention.
Figure 4B:
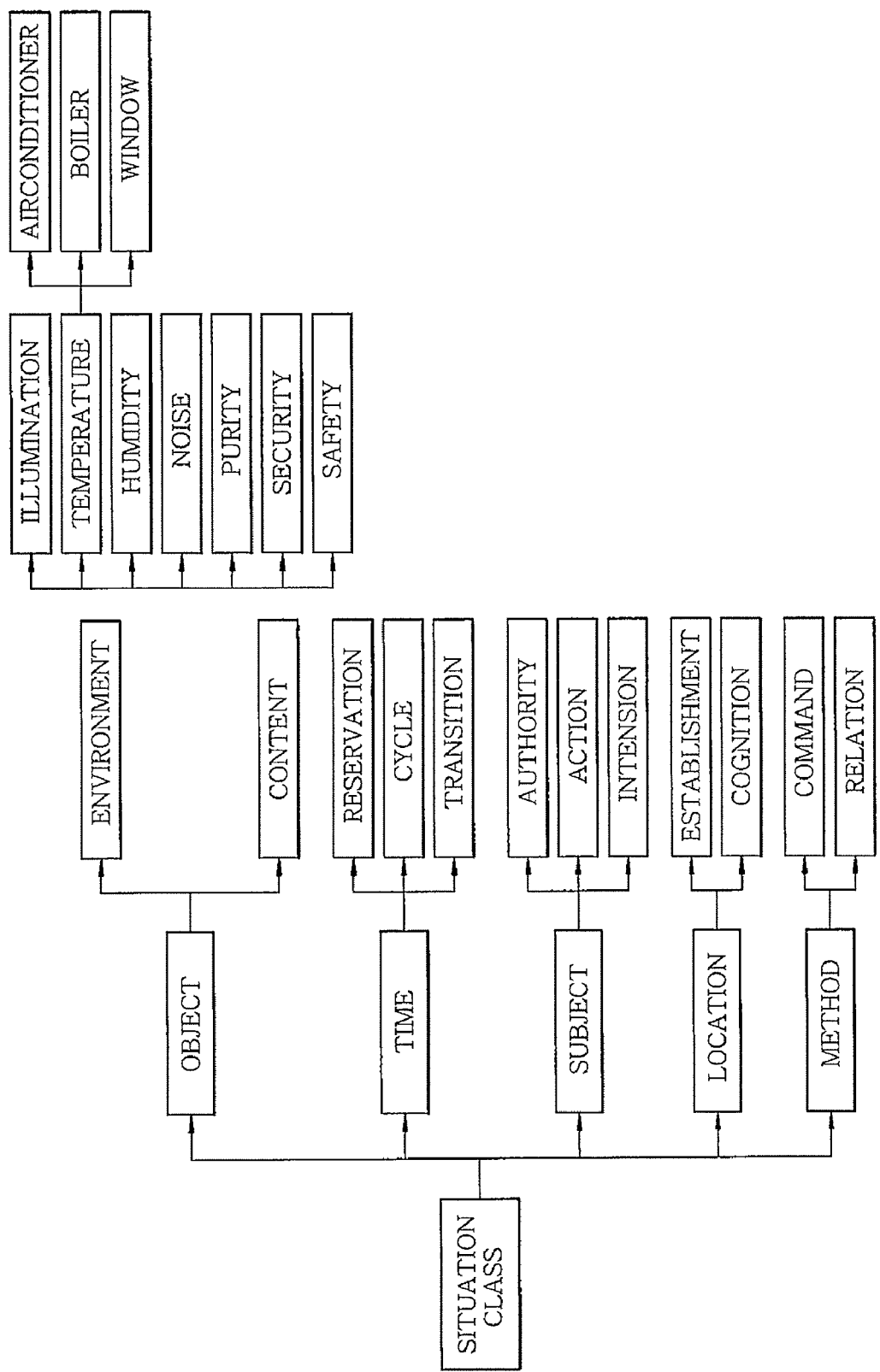
Figures 4C, 5:
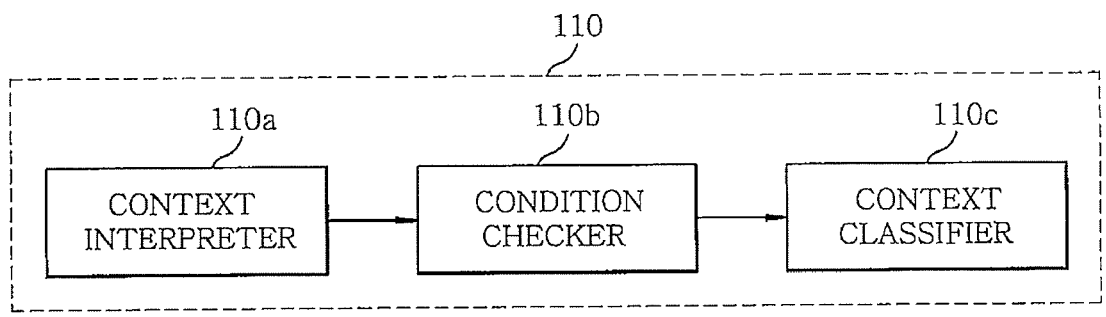
FIG. 5 illustrates a detailed block diagram of a context analyzer shown in FIG. 1.

As one example, FIGS. 4A to 4C illustrates that the specification interpreter 106 generate the knowledge rules for the home network in accordance with the present invention.

The resource interpreter 106a classifies the components such as devices, networks and services into items by function of each component's type such as function type, function ID, action, event and the like and then interprets the classified components, as shown in FIG. 4A. In FIG. 4A, action contains sub-items such as action ID, in-parameters, out-parameters, etc.; and event contains sub-items such as event ID, value, etc.

The relation establisher 106b, as shown in FIG. 4B, divides a situation class into items such as object, time, subject, location, method, etc. In FIG. 4B, object is divided into environment and content, wherein environment contains sub-items such as illumination, temperature (e.g., related to an air conditioner, a boiler, a window, etc.), humidity, noise, purity, security, safety. Also, time contains sub-items such as reservation, cycle, transition; subject contains sub-items such as authority, action, intension; location contains sub-items such as establishment, cognition; and method contains sub-items such as command, relation.

The diagnosis rule generator 106c, as illustrated in FIG. 4C, can generate diagnosis rules as follows: for 'Rule 1', when an air conditioner is running, temperature goes down; and, for 'Rule 2', when a boiler is running, temperature goes up. These diagnosis rules are stored and managed as the knowledge rules in the knowledge rule DB 108.

The knowledge rule DB 108 stores and manages the knowledge rules generated from the specification interpreter 106 about the home network. Upon request of these knowledge rules, they are extracted and provided to the context analyzer 110.

Meanwhile, the context analyzer 110 analyzes if currently collected contexts meet the rules of the home network. That is, the context analyzer 110 analyzes if the context information (i.e., 4W1H-based context information being inputted in real time while the home network operates) collected in the context repository 104 meet the knowledge rules (i.e., the knowledge rules for fault detection) of the home network stored in the knowledge rule DB 108, and classifies the context information into normal situation contexts and abnormal situation contexts based on the analysis results to deliver the abnormal context information and their corresponding fault rules (i.e., the knowledge rules) to the context pattern learner 112.

FIG. 5 illustrates a detailed block diagram of the context analyzer 110 shown in FIG. 1. As shown, the context analyzer 110 includes a context interpreter 110a, a condition checker 110b, and a context classifier 110c.

The context interpreter 110a interprets the context information (i.e., 4W1H-based context information being inputted in real time while the home network operates) collected in the context repository 104, and forwards the interpretation results to the condition checker 110b.

The condition checker 110b analyzes if the interpretation results of the context information meet the knowledge rules (i.e., the knowledge rules for fault detection) of the home network stored in the knowledge rule DB 108.

Lastly, the context classifier 110c classifies the context information into normal situation contexts and abnormal situation contexts on the basis of the analysis results from the condition checker 110b, and delivers the abnormal situation contexts and their corresponding fault rules (i.e., the knowledge rules) to the context pattern learner 112.

Referring again to FIG. 1, the context pattern learner 112 learns a correlation between the abnormal context information and their corresponding fault rules by using a neural network to generate new patterns related to new fault causes. The newly generated patterns of fault causes are stored and managed in the knowledge rule DB 108 as a correlation probability table corresponding to the new knowledge rules.

Figure 6:
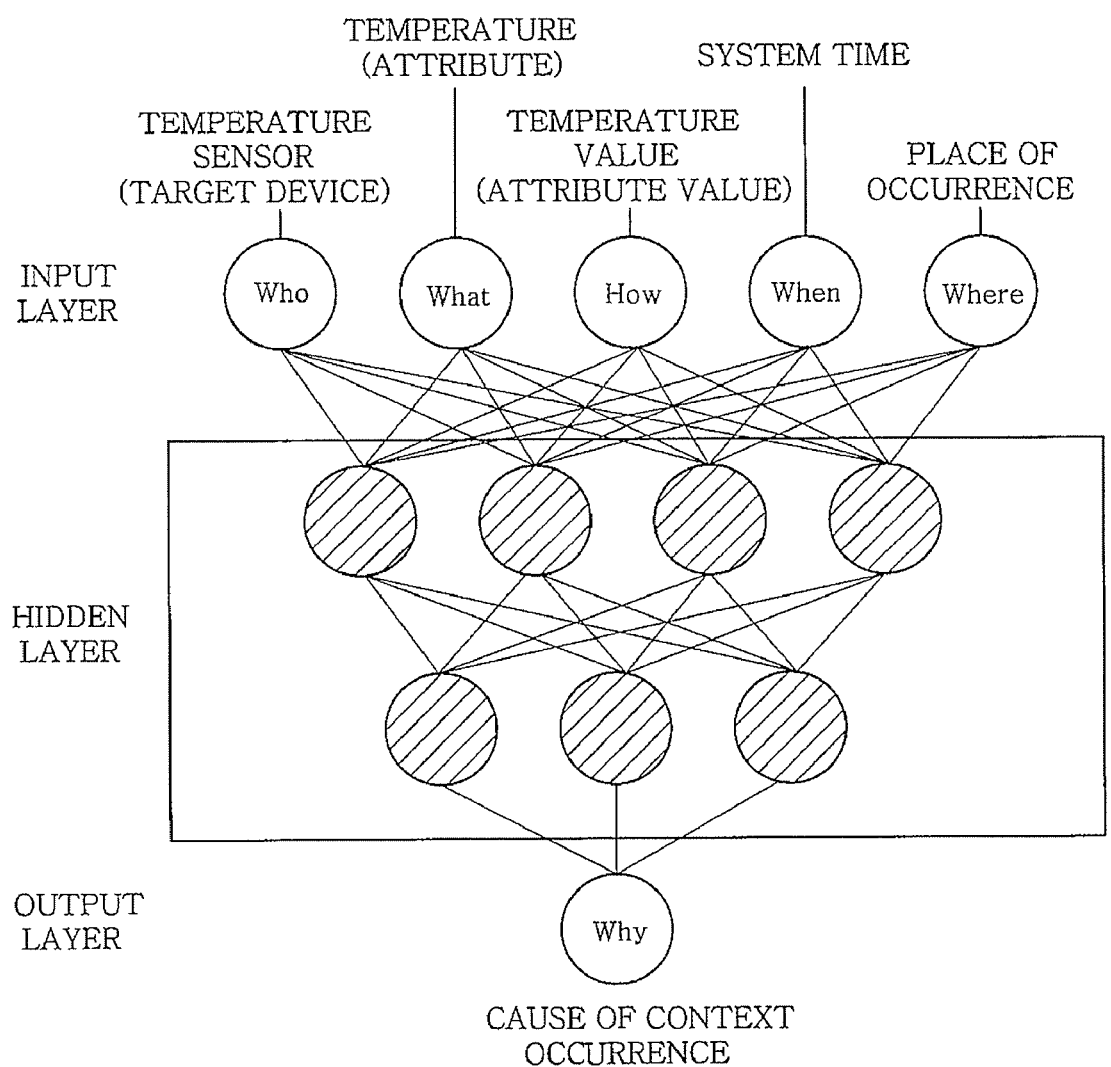
FIG. 6 presents a neural network for learning a correlation between contexts and fault rules in accordance with the present invention.

FIG. 6 shows a neural network for learning a correlation between contexts and fault rules in accordance with the present invention. In this neural network, the context information (e.g., attributes) based on 4W1H (e.g., temperature sensor, temperature, temperature value, system time, place of occurrence, etc.) are inputted to an input layer. A target output value to an output layer is context information that acts as a cause inducing such context (i.e., a cause of context occurrence). Based on this, a correlation between the input context information and the cause of the context occurrence is learned to adjust weights of the neural network. In this manner, the correlation between the fault cause of the neural network and fault patterns causing the faults is learned.

Referring again to FIG. 1, the fault predictor 114 analyzes a correlation between the correlation probability table between the context information and fault knowledge stored in the knowledge rule DB 108, and context patterns collected in real time, and reports fault knowledge rules that may be taken place in advance.

The following is a detailed description of a procedure of predicting faults, in which the system for fault prediction in the home network with the above configuration generates real-time input contexts about devices, networks and services, and stores the context information, analyzes the context information and its knowledge rules and learns context patterns by using a neural network structure, with the knowledge rule database obtained by interpreting the contexts based on the specifications of devices, networks, services, etc. being stored in a database in advance.

FIG. 7 illustrates a flow chart for a method for predicting faults based on log learning in a home network environment in accordance with the present invention.

First, in step 702, the resource interpreter 106a of the specification interpreter 106 receives specifications about the components such as devices, networks, and services of the home network from the device specification 100a', the network specification 100b' and the service specification 100c', respectively, and interprets information (i.e., constraints) on each component based on the specifications and gives the information semantics. The relation establisher 106b then establishes a relation between the semantics of the components such as devices, networks, and services.

Thereafter, in step 704, the diagnosis rule generator 106c of the specification interpreter 106 generates new knowledge rules for the home network on the basis of functions that affect the establishment of relation between the component specifications, and stores the new knowledge rules in the knowledge rule DB 108.

Subsequently, in step 706, the status data collector 102a of the context generator 102 collects status data of devices, networks, services through the device checker 100a, the network checker 100b and the service checker 100c, and provides the status data to the context mapper 102b, and then, the context mapper 102b digitizes and normalizes or maps each status data into 4W1H-based context information.

After digitizing and normalizing the status data into the context information, in step 708, the context mapper 102b organizes context information by establishment of a correlation between the data and by extraction of features of the data, and stores the same in the context repository 104.

Next, in step 710, the context interpreter 110a in the context analyzer 110 interprets the context information (i.e., the 4W1H-based context information being inputted in real time while the home network operates) collected in the context repository 104, and delivers the interpretation results to the condition checker 110b, and then, the condition checker 110b analyzes if the interpretation results of the context information meet the knowledge rules (the knowledge rules for fault detection) for the home network stored in the knowledge rule DB 108.

In step 712, the context classifier 110c in the context analyzer 110 classifies the context information into normal situation contexts and abnormal situation contexts based on the analysis results, and provides the abnormal situation contexts and their corresponding fault rules to the context pattern learner 112.

In a following step 714, the context pattern learner 112 learns a correlation between the abnormal situation contexts and their corresponding fault rules by using the neural network structure to generate new patterns of new fault causes.

The newly generated patterns of fault causes are stored and managed in the knowledge rule DB 108 as a correlation probability table corresponding to the new knowledge rules.

For example, FIGS. 8A to 8D are views illustrating an example of generating new fault knowledge for the home network in accordance with the present invention. FIG. 8A represents the context information which is generated based on data generated in real time; and FIG. 8B shows one of the knowledge rules. In order to determine whether the context information in FIG. 8A meet 'Rule 1' in FIG. 8B, contexts, as such C1, C5, and C7, are used. Among them, in case of C5, since the temperature went down, a set of contexts (i.e., C2, C3, and C4) between C1 and C5 can be classified into a set of normal situation contexts satisfying 'Rule 1', as depicted in FIG. 8C. In case of C7, the same temperature as in C5 is kept, and thus, C6 can be classified into a set of abnormal situation contexts that do not satisfy 'Rule 1', as shown in FIG. 8C.

This context C6 can be used to generate a new fault rule for the home network (i.e., knowledge rule), which is shown as 'New Rule' in FIG. 8D, by inserting an additional condition for the context C6 to 'Rule 1'. The correlation probability table corresponding to 'New Rule' is organized as shown in FIG. 9, and then stored and managed in the knowledge rule DB 108.

Referring again to FIG. 7, in step 716, the fault predictor 114 predicts and outputs faults in a way to analyze a correlation between the correlation probability table and context patterns collected in real time, and then to report fault knowledge rules to be generated to the user (e.g., the user terminal, etc.) in advance.

Therefore, the present invention can effectively predict and report the faults in the home network by storing each context information being inputted in real time about the status of the home network, comparing and analyzing each stored context information and the knowledge rules stored in a database based on the specifications of the home network to generate and store new knowledge rules, and using the knowledge rules.

As described above, the present invention provides a technique of establishing the knowledge rule DB, and estimating and reporting faults that may occur in the future by analyzing fault patterns based on logs generated in the home network. With this technique, it is possible to prevent home network accidents in advance, which are fatal and cause an immense economic loss even by just one occurrence, such as fire accidents, and to detect and predict internal and external factors threatening the home network in real time by employing an unmanned automatic mechanism. Accordingly, the present invention can provide the user with an improved reliability for the home network system and also a home network provider with a decreased burden of maintenance costs of the home network.

While the invention has been shown and described with respect to the particular embodiments, it will be understood by those skilled in the art that various changes and modification may be made.

What is claimed is:

1. A system for fault prediction in a home network, the system comprising:
   a processor and a memory, the memory haying stored thereon:
   a context generator for generating context information based on status data collected in real time about components of the home network;
   a specification interpreter for generating knowledge rules for fault detection by using specifications of the components of the home network;
   a context analyzer for analyzing if the generated context information meet the generated knowledge rules to classify the context information into normal situation contexts and abnormal situation contexts;
   a context pattern learner for generating new knowledge rules based on the abnormal situation contexts and fault rules corresponding to the abnormal situation contexts;
   a knowledge rule database for storing and managing the knowledge rules and the new knowledge rules; and
   a fault predictor for analyzing a correlation between the knowledge rules or the new knowledge rules and the generated context information, thereby predicting faults to be generated.

2. The system of claim 1, wherein the context generator comprises:
   a status data collector for collecting the status data in real time; and
   a context mapper for establishing a correlation between the status data, and extracting features of the status data by digitizing and normalizing the status data to generate the context information.

3. The system of claim 2, wherein the status data is digitized and normalized into the context information based on 4W1H (when, where, who, what, and how).

4. The system of claim 1, wherein the specification interpreter comprises:
   a resource interpreter for interpreting the specifications and giving the specifications semantics;
   a relation establisher for establishing a relation between the semantics; and
   a diagnosis rule generator for generating the knowledge rules based on functions that affect the establishment of the relation between the specifications of the components.

5. The system of claim 1, wherein the context analyzer comprises:
   a context interpreter for interpreting the context information;
   a condition checker for analyzing if the interpretation results of the context information meet the knowledge rules; and
   a context classifier for classifying the context information into the normal situation contexts or the abnormal situation contexts depending on the analysis results from the condition checker, and providing the context pattern learner with the abnormal situation contexts and the fault rules corresponding to the abnormal situation contexts.

6. The system of claim 1, wherein the context pattern learner learns a correlation between the abnormal situation contexts and the fault rules by using a neural network, and creates new context patterns corresponding to new fault causes based on the correlation to generate the new knowledge rules.

7. The system of claim 6, wherein the context pattern learner generates a correlation probability table corresponding to the new knowledge rules.

8. The system of claim 7, wherein the fault predictor analyzes the correlation between the correlation probability table corresponding to the new knowledge rules and the context information collected in real time.

9. The system of claim 1, further comprising a context repository for storing and managing the context information generated by the context generator as well as the correlation and the features corresponding to the context information.

10. A method for fault prediction in a home network, comprising:

generating context information based on status data collected in real time about components of the home network;

generating knowledge rules for fault detection by using specifications of the components of the home network;

analyzing if the generated context information meet the generated knowledge rules to classify the context information into normal situation contexts and abnormal situation contexts;

generating new knowledge rules based on the abnormal situation contexts and fault rules corresponding to the abnormal situation contexts; and analyzing a correlation between the new knowledge rules and the generated context information thereby predicting faults to be generated.

11. The method of claim 10, wherein said generating context information comprises:

collecting the status data in real time; and digitizing and normalizing the status data to establish a correlation between the data, and extracting features of the data to generate the context information.

12. The method of claim 11, wherein the status data is digitized and normalized into the context information based on 4W1H (when, where, who, what, and how).

13. The method of claim 12, wherein the context information includes the correlation and the features, and is stored and managed in a context repository.

14. The method of claim 10, wherein said generating knowledge rules comprises:

interpreting the specifications and giving the specifications semantics;

establishing a relation between the semantics; and generating the knowledge rules based on functions that affect the establishment of the relation between the specifications of the components.

15. The method of claim 14, wherein the knowledge rules are stored and managed in a knowledge rule database.

16. The method of claim 10, wherein said analyzing if the generated context information meet the generated knowledge rules comprises:

interpreting the context information; and analyzing if the interpretation results of the context information meet the knowledge rules.

17. The method of claim 16, wherein said generating new knowledge rules comprises:

classifying the context information into normal situation contexts or abnormal situation contexts depending on the analysis results; and providing the abnormal situation context and the fault rules to generate the new knowledge rules.

18. The method of claim 10, wherein the new knowledge rules are generated by learning the correlation between the abnormal situation context and the fault rules by using a neural network structure, and creating new context patterns corresponding to new fault causes based on the correlation.

19. The method of claim 18, wherein the new knowledge rules are organized as a corresponding correlation probability table.

\* \* \* \* \*